Dec. 6, 1955  V. RAKOWSKY  2,725,983
WHIRLPOOL SEPARATION OF PARTICULATE MATERIALS
Filed Oct. 30, 1953  2 Sheets-Sheet 1
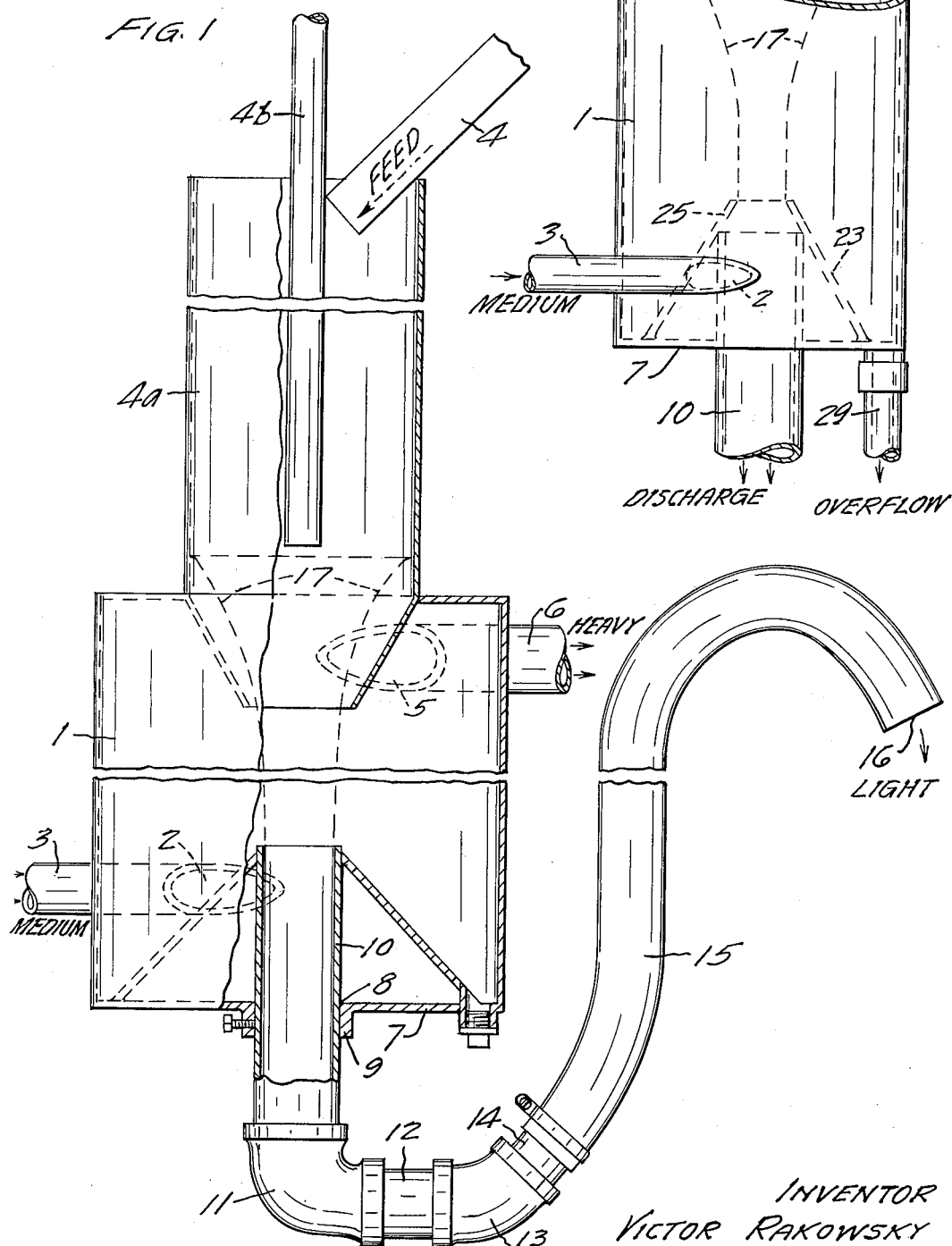

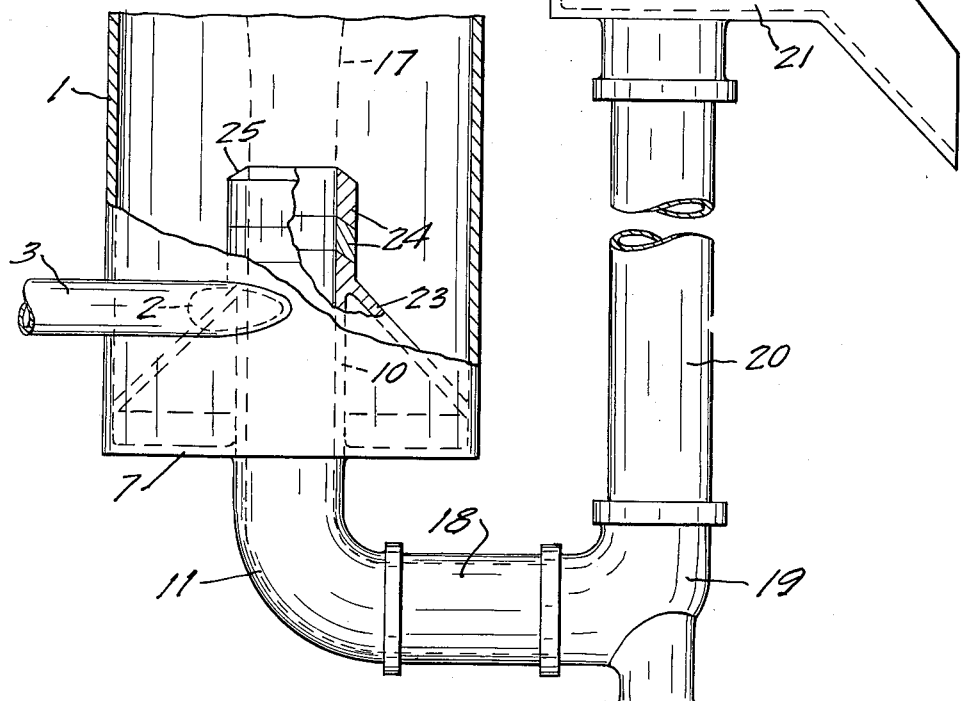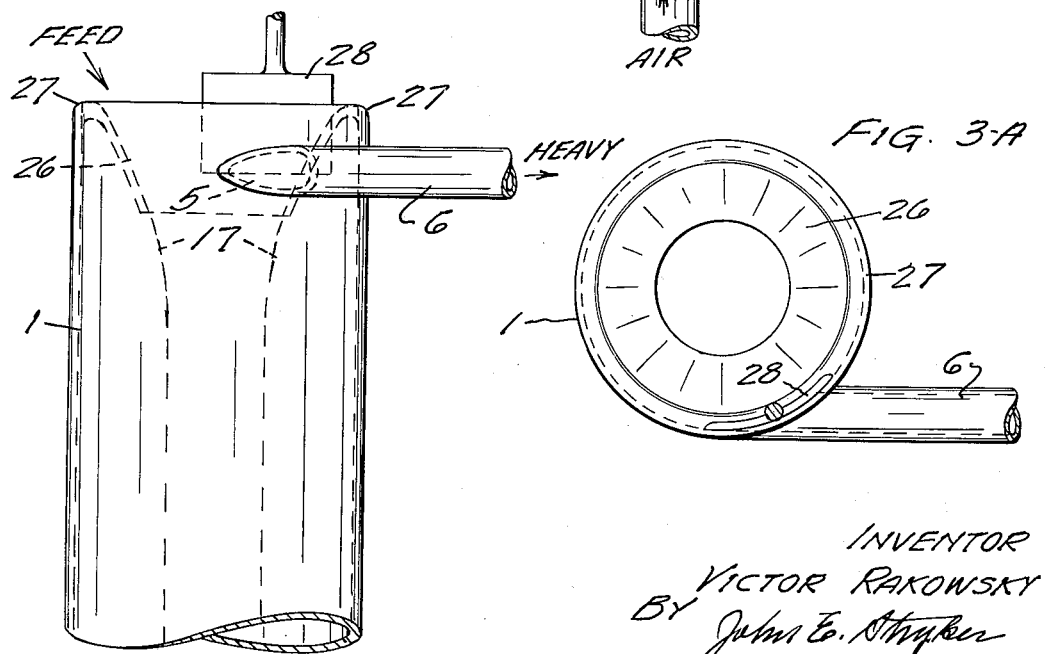

United States Patent Office 2,725,983
Patented Dec. 6, 1955

2,725,983

WHIRLPOOL SEPARATION OF PARTICULATE MATERIALS

Victor Rakowsky, Joplin, Mo.

Application October 30, 1953, Serial No. 389,309

13 Claims. (Cl. 209—211)

This invention relates to the separation of heterogeneous mixtures of solid particles of differing specific gravity into fractions in accordance with specific gravity. As such, it contemplates both process and apparatus improvements for making these separations. More specifically, the invention is concerned with improvements in such density separations accomplished by treatment in a spirally-flowing separatory fluid. Still more particularly, in the present invention, provision is made for separation at a density greater than that of the separatory fluid.

In the last several decades, industry has shown a markedly increasing interest in so-called "sink and float" separations of mixtures of solid particles. Industrial progress in this field has included the development of many different process and equipment improvements for the separation of particulate solids mixtures into fractions of differing specific gravity. Many acceptable and successful installations have been, and are being, built and operated. One feature, employed in all such processes and equipment is the immersion of the particulate mixture to be separated in some "high-density" fluid in which the separation is accomplished. This separatory fluid may be a true liquid or solution of sufficient density or more commonly a heavy media separatory fluid, i. e., a suspension of solid "medium" or "media" particles in a liquid, usually water or an aqueous solution.

The more common types of installation involve the establishment of a large "static" body of relatively quiescent separatory medium. Ancillary thereto are necessary and suitable provisions for maintaining substantially hydraulic equilibrium therein. The solids mixture to be separated is dropped into this body of medium. The lighter gravity fraction floats to the top and is removed, generally by overflowing. The heavier fraction sinks to the bottom and is removed by some suitable mechanical or hydraulic means.

More recently, a modification of the quiescent zone usage has appeared. A similar, high-density, separatory fluid is used. It is caused to whirl in a small confined space at such high angular velocity that an open central vortex is created. The heavier material falls down the outer part of the containing vessel and the lighter, or float fractions rise up through the central vortex. The resultant rotary parting forces are largely independent of and in the order of magnitude of many times normal gravity. Such systems, where they can be used, are highly efficient.

More recently there has been disclosed in my copending applications for U. S. Letters Patent, Serial Nos. 241,721 and 241,722, filed August 14, 1951, novel separatory processes which combine for the first time the adaptability of the large "static" installations to handle large particles in a dynamic separation in smaller apparatus of exceedingly high capacity. At the time these processes do not remotely require the critically high angular velocities required in previous dynamic systems.

In general, the novel separatory processes of both my above noted copending applications involve imparting to a body of fluid having approximately the desired separating density a downward rotary motion through a horizontally confined space at sufficiently angular velocity so that a free vortex is created. Fluid flow from the confined space is divided. One discharge flow is downward through a centrally located opening which discharges that fluid flow concentric with and including the vortex center. The remaining fluid flow also is discharged downwardly, but from a level below the centrally positioned opening.

Particulate materials to be separated into differing gravity fractions are introduced into an upper level of the confined space, considerably above the central opening. Due to the dynamic forces forming vortex and the density of the fluid, the lower gravity particulate material is carried around and down near the face of the vortex to be discharged as the "light" fraction through the central opening. Because of the continued application of dynamic forces in the levels below the central opening, the higher gravity particles are carried down with much of the remaining fluid and discharged as a "heavy" fraction from the lower level.

While such separations proved quite useful with many ores, the distribution of the middlings, between the two fractions, in some cases could not be sufficiently well controlled. It was also found that separation occurred at a specific gravity somewhat higher than the apparent density of the fluid. If this differential could be increased it would in many cases permit more economical materials to make up the fluid. Accordingly, the principal objects of the present invention are to provide more accurate control of the middlings discharge and to provide for separation at gravities much higher than the fluid density.

The present invention is an improvement over the processes and apparatus of my above discussed copending applications and, as such, forms a continuation-in-part thereof.

In general, the instant invention is similar to my copending application to the extent that it operates on a dynamic rather than on a static principle. Thus, as in my copending application, a rotary flow is imparted to a large body of separatory medium thereby forming a free vortex with a resulting separation of a particulate mixture into light and heavy fractions. It differs, however, in the manner in which the free vortex is created and maintained. It further differs in the relative points of introducing to and discharging from the confined space of the various flows noted above in the discussion of my copending application.

In the present invention, the type of solids and the specific method used in recovering or cleaning them is not critical. The invention is applicable for use with any suitable recovery system. This is true, whether the separatory medium is a true liquid or a suspension-type "medium." If the medium is a suspension type, then so long as some suitable method of cleaning and recovering the medium solids is available, and the solids may be made up into fresh fluid of the proper density and recycled, the other advantages of the present invention may be obtained.

Further discussion of the present invention may be more easily followed by reference to the accompanying drawing in which:

Figure 1 is an elevation, partly in section, of one form of separatory device employing the principles of this invention;

Fig. 2 is an elevation partly in section, showing a modification of the lower portion of the device;

Fig. 3 is an elevation showing a modification of the upper portion of the separator;

Fig. 3A is a top view of Fig. 3, and
Fig. 4 is an elevation showing a further modification to the lower portion of the separator.

Figure 1 shows an apparatus arrangement illustrating the principles of the present invention. The separating action takes place in a space confined by a tubular element 1. Element 1 may be of various shapes but preferably is circular for simplicity of construction. In the side of this tubular element and opening into the space is a medium inlet port 3. This port is located near the bottom portion of the tubular element and preferably, but not necessarily, opens tangentially into said confined space. Attached about this port 2 by any conventional means such as welding is a conduit 3 through which a separatory medium of the desired specific gravity is fed.

Tubular element 1 is open at its upper end. Extending through this open end and into the confined space is a feed means for introducing the particulate mixture to be treated. In Figure 1 this feed means is shown as a chute 4 and tubular extension 4a, but any means may be employed, provided it feeds the mixture in the proper manner. Where the tubular extension 4a is vertically elongated, as shown, air may be supplied centrally to the upper portion of the vortex through a pipe 4b. Particulate materials employed in the process may be derived from any source and be conveyed to the separatory system of this invention by any suitable means. Neither the source of materials nor the means for conveying form any part of this invention, and accordingly, are not shown.

Opening into the side of the tubular element 1 near the upper open end thereof is a discharge port 5. Connected about this port 5 by any suitable means is a discharge conduit 6. Port 5, like port 2, preferably opens into the confined space tangentially. One fraction of the treated material is discharged from the confined space through conduit 6. Conduit 6 conveys it to the next treatment, usually a screening operation, which is not shown since it forms no part of this invention.

Tubular element 1 is closed at the bottom by a member 7 which is attached thereto by any suitable means. Centrally located in this member 7 is an opening 8. Surrounding opening 8 is a collar 9, and extending therethrough to a predetermined level within the tubular element 1 is a discharge conduit 10. Conduit 10 extends downwardly and outwardly of element 1 terminating in an elbow 11. This elbow is connected by a conventional nipple 12 to a second elbow 13 which, in turn, is connected to a second nipple 14. The other end of nipple 14 is connected to a flexible conduit 15, the remaining end 16 of which terminates at some predetermined height. Through this conduit arrangement is discharged the other fraction of the treated material.

Operation of the arrangement shown in Figure 1 is believed to be apparent from the description thereof. Separatory medium is introduced into the confined space, defined by element 1, through conduit 3 and port 2. As pointed out above, the separatory medium is preferably introduced tangentially so as to aid in giving the fluid a rotary motion as it passes into and upwardly within the confined space. Medium is introduced under sufficient pressure and in sufficient volume so as to fill the confined space. A part of this volume will be discharged through port 5 while the remainder will be caused to flow inwardly and downwardly toward the central lower level thus creating a whirlpool or free vortex. This free vortex will have the approximate shape as indicated by reference numeral 17. Although a vortex of the desired profile may be formed by introducing the medium in sufficient volume and angular velocity, auxiliary mechanical means may be employed in the lower part of the confined space to aid in creating the necessary rotary motion.

Provided that the annular space between discharge conduit 10 and tubular element 1 is maintained full of medium, there will be a flow into conduit 10. However, in order to obtain the desired separation, the fluid must be introduced in sufficient volume to raise the level within the confined space substantially above the top of conduit 10. In this way there will be a second discharge of medium conducted through port 5 and conduit 6. That medium not discharged through 5 continues to flow inwardly and downwardly to be discharged into conduit 10. When these two discharges have been established, there is created what appears from above to be a whirlpool having a vortex extending inside conduit 10. This vortex is open from the top of the confined space down through conduit 10.

Once the vortex has been established, the inflow of fluid medium and the two discharge flows are maintained constant so as to keep the conditions within element 1 steady. The particulate mixture which is to be treated is then introduced into the confined space by chute 4. This material is preferably fed into the surface of the vortex near the upper portion thereof. As a consequence of the whirling action, the lower gravity particulate material is carried inwardly and downwardly on the surface of the whirlpool to be discharged through conduit 10. The higher gravity particles, on the other hand, are carried downwardly and outwardly by the action of the whirlpool and then upwardly by the action of inflowing medium, to be discharged through port 5 and conduit 6.

Various adjustments of the separator may be made so as to obtain the desired results. An examination of the light fraction will disclose whether or not the desired separation is being obtained. If such an examination reveals too much heavy material passing out with the light fraction, the volume discharge through conduit 10 must be decreased. This may be accomplished by decreasing the feed of medium through conduit 3, by raising the height of conduit 10 within the confined space, by changing the specific gravity of the medium, or by raising the height of discharge opening 16. Any combination of any two or more, or all four of these may likewise be used to accomplish this result. Ordinarily, however control of the rate of discharge through the conduit 10 presents no problem and satisfactory results may be obtained merely by suitable adjustment of the rate of discharge through the port 5 and conduit 6.

If there is insufficient lower density material passing out conduit 10, it may be increased by increasing the input of medium through conduit 3. It likewise may be increased by lowering conduit 10 or lowering discharge outlet 16. Of course, any of various combinations of these may be used to accomplish the same result.

It should be noted that the whirlpool as represented by profile 17 extends above the heavy fraction discharge outlet 5. To avoid possible splashing out of the open top of tubular element 1, the walls of element 1 should be extended sufficiently high above outlet 5. Although one of the advantages of this process is the fact that it is unnecessary to maintain a huge storage system of fluid medium and also unnecessary to use high pressures and velocities, nevertheless, surges in the system may sometimes occur. Such surges will affect the top level of the whirlpool resulting in possible splashing through the open top unless the walls of element 1 are sufficiently high to prevent this.

Figure 2 shows several modifications not shown in Figure 1. It should be noted, however, that Figure 2 has elements common with those disclosed in Figure 1. Tubular element 1 is similar to that disclosed in Figure 1 as are conduits 3 and 10. However, elbow 11 of conduit 10, instead of being connected through suitable connections to a flexible gooseneck, is instead connected to a short conduit 18 which in turn is connected to a T member 19. Extending upwardly from one branch of the T is a conduit 20 which is connected at its other end to a discharge launder 21. The third branch of T 19 is connected to a small downwardly extending conduit 22. Air is introduced through conduit 22 and lifts the light fraction passing from the separator into conduit 10 through conduit 20 up and into the launder 21. By controlling the flow of air through conduit 22, the volume of medium discharged through conduit 20 may be controlled.

Another modification shown in Figure 2 is baffle 23. This member is a frustrum of a cone and extends from a point on that part of conduit 10 extending into the confined space downwardly to the bottom wall 7 of tubular element 1. This baffle 23 helps in giving a rotary motion to the incoming fluid medium and also effects the smoothing out of said flow. In this way an even, rotary, upward flow is established.

One further modification is shown in Figure 2. To that part of conduit 10 which extends into the confined space, are attached a plurality of ring segments 24 of the same diameter as conduit 10. These elements may be properly designed so as to snugly fit one another to provide an extension of conduit 10. In order to secured proper separation, it is sometimes necessary to increase the height of conduit 10. This may be effectively done to any height needed by the use of a sufficient number of ring segments 24. This is probably a superior way of changing the height of conduit 10 over the arrangement shown in Figure 1 wherein the conduit may be raised and lowered in conjunction with collar 9.

The top segment 25 shown in Figure 2 has its walls converging upwardly. This is another way by which the flow through conduit 10 may be decreased. Element 25 may be designed similarly to segments 24 so as to fit snugly with any other segment or with the top of conduit 10. A similar member having diverging walls may, in a like manner, be used to increase the discharge flow through conduit 10.

Further modifications are shown in Figure 3 which discloses the upper portion of a separator. As in Figure 1, the separator consists of a tubular element 1 having a similar discharge port 5 and discharge conduit 6. However, extending through the open top of conduit 1 is an inverted frustrum of a cone 26. It extends into the confined space to a point at which it barely intersects the surface of the free vortex. Element 26 serves to smooth the flow of the heavy fraction in its discharge through port 5 as well as to direct the remaining flow of medium inwardly and downwardly toward the central lower level. The rounded corners 27 are another modification shown in Figure 3. These further aid to smooth the medium in its flow to the discharge conduits. One further modification is shown in Figure 3. Associated with port 5 is a sliding gate 28 which may be controlled by means extending to the outside of tubular element 1. This gate is further shown in Figure 3A. In this way, discharge of flow through port 5 and conduit 6 may be controlled as desired. Another method of controlling the rate of discharge through the conduit 6 is to extend this conduit upward to a predetermined elevation above the port 5 and provide an air lift in this conduit like that shown in Fig. 2.

Figure 4 shows an additional modification. Conduit 10, with the associated baffle 23 and converging ring segment 25, is similar to that disclosed in Figure 2. Not shown in any of the previous figures, however, is an overflow or drain conduit 29 extending downwardly from the bottom 7 of the separator. Through the overflow conduit, additional fluid medium may be extracted during the operation of the device. All solids, however, report to conduits 10 and 6 according to their density. By the use of an overflow as in Figure 4, whirlpool speed is increased, thus increasing the separating action.

Numerous other modifications and variations may be made without extending beyond the concept of this invention. For instance, member 26 shown in Figure 3, may be inverted from the position shown therein. In such a position, the walls of the baffle will diverge toward the walls of the tubular element. Extension of member 26 into the confined space might be to a degree such that the walls thereof would intersect the surface of the vortex. In such a modification, feed of the particulate material will be to the annular space confined by the baffle and the walls of the tubular element. Release of the compressive force on the fluid medium as it passes downwardly from the annular space will tend to increase the separating action.

Another modification not shown in the drawing is the use of several discharge conduits associated with conduit 10 whereby a plurality of light fractions can be recovered. Such an arrangement might consist of a plurality of decreasing concentric conduits with each smaller conduit extending slightly higher into the confined space than the next larger one. In such an arrangement the innermost and highest conduit would withdraw the lightest fraction.

Various other arrangement for feeding the particulate material might be employed. For instance, an arrangement might be employed to convey the material into the device in a circular path whereby the material will be given the same rotary motion as the fluid medium. In this way the particulate material may be deposited smoothly and evenly onto the surface of the whirlpool.

It is apparent, therefore, that various mechanical equivalents may be employed in the structural combination of this invention. It is necessary however, that certain essential elements be present. First, there must be a member of suitable shape defining a horizontally confined space in which the separating treatment occurs. Means must be present in the lower level of said space for introducing fluid medium. Also in the lower level of the space must be provision for discharging a part of the fluid medium whereby a free vortex may be established. In the upper level of the space, preferably sufficiently high to be above the top rim of the vortex, must be means for introducing particulate material to be separated. Also within the upper level must be provision for discharging the remainder of the fluid medium not discharged in the lower discharge means. Flow control means must be associated with each of the fluid inlet and discharge means whereby the volume of medium passing into the device and discharging from each of the discharge means may be accurately controlled.

The process limitations are essentially few and simple. The free vortex of this invention is established by a flow of fluid medium which is rotary as it enters the confined space. It then extends upwardly along the walls of the confining element into the upper regions of the confining space. Herein it changes so as to extend inwardly toward the center of the confining space and downwardly toward the central discharge conduit. The flow into the vessel must be of sufficient volume and velocity to maintain this free vortex and to carry any heavy fraction upwardly to the upper discharge conduit. Sufficient flow must also be maintained through the central discharge conduit to discharge the desired proportion of lesser density particles. Feeding of particulate materials to be treated should be so conducted as to avoid any possibility of portions thereof escaping directly down the open vortex and out through central discharge without being subjected to the separating action.

Once the vortex is created and the particulate material introduced, a density gradient, due to the spiral flow, develops from the lower level of the confined space to the upper level thereof. Taken in conjunction with the forces exerted by the spiral flow, it is possible to accomplish separation of the particulate mixture into fractions at an apparent parting density higher than the specific gravity of the incoming separatory fluid. For example, the specific gravity of separation may be several tenths higher than the actual specific gravity of the incoming separatory medium.

This ability of the process of the present invention to operate at a parting density above the average specific gravity of the separatory fluid produces several other additional advantages. Where a magnetic cleaning system is used to recover media, it makes little difference whether demagnetization is done or not. The magnetic aggregates will be broken up by the operation of the process, the centrifugal and centripetal forces ordinarily being greater than the magnetic attraction of the ferro particles. It reduces the necessary amount of the medium solids in circulation in any one operation. Perhaps even more important, it permits the use of coarser medium solids than would be suitable for conventional operations. If the medium is made up of coarser media solids, its viscosity is lower and the sharpness of separation is increased. Presumably this is due to the decreased resistance to the passage of particles through the moving layers of separatory fluid.

Sharpness of separation is increased by the use of coarser media which also cuts down on the amount of medium cleaning which must be carried on. The separatory system is less sensitive and greater amounts of slimes and fines in the recycled medium can be tolerated without viscosity becoming excessive.

In addition, there is a still further advantage. The same phenomenon that permits the operation at a parting density greater than the specific gravity of the fluid produces some thickening of the heavy fraction flow. Slimes and fines, therefore preponderantly pass with the lighter density fraction. The heavy drainage medium, if so desired, can be in most cases directly recycled without any further cleaning. With regard to the light fraction drainings and washings and the heavy fraction washings, only a minimum volume must be sent to the medium solids cleaning and recovery system. Also, because of the fluid medium containing coarser media solids having a greater tolerance for slimes and fines, considerable amounts of the light-fraction drainings and some washings may be directly recycled as diluent liquid. This fraction can be greater in proportion to the total amount of fluid in circulation than for any previously known system.

In addition, because the medium solids used are coarser than in normal operation of previously known procedures, a large part of the solids may be quickly recovered by thickening without the necessity for passing the entire fraction to be cleaned through a complete cleaning. When a magnetic cleaning system is used, this is an appreciable advantage in reducing the investment in ancillary equipment. Not only can a larger fraction be recycled, but because of the quicker settling of the coarser media, the fraction containing only water, slimes and valueless fines may be directly discharged without ever having to pass through the medium solids cleaning system.

In operating the process of the present invention, one feature should be noted. Contra to practice in cyclonic systems, wherein velocities must be maintained sufficiently high to produce an upwardly rising inverted vortex, no such factors enter into the present operation because high pressures are not necessary. In operating the separation process of the present invention, the volume of flow is more important than pressure. As noted above, certain volumes are required through the various discharge conduits to maintain separation conditions. pressure at which it is delivered is relatively unimportant. So long as this volume of fluid is delivered to the unit, the pressure at which it is delivered is relatively unimportant.

Having described my invention, what I claim as new and desire to protect by Letters Patent of the United States is:

1. A method of separating a mixture of particulate materials of differing specific gravities into fractions of differing average specific gravities, respectively higher and lower than a selected specific gravity, which method comprises: introducing a fluid of apparent density approximating but less than said selected gravity near the lower end of a vertically elongated confined space; causing said fluid to flow spirally around and thru said space; discharging a portion of said flow near the upper end of said space and the remainder near the lower end of said space; maintaining the input pressure and flow rate sufficiently high to cause and maintain an open free vortex extending from one open end of said space to the other open end; introducing said particulate mixture into the inner face of said vortex; removing said higher gravity fraction, together with the fluid discharge from the upper end of said space and from a point radially removed from the axis of said space; and removing said lighter gravity fraction, together with the fluid discharge substantially axially from the lower end of said space.

2. The method in accordance with claim 1 wherein the relative flow rates of discharge from near the respective ends of said space are so adjusted and controlled as to cause said higher and lighter gravity fractions to be removed from said space in predetermined proportions.

3. A method of separating a mixture of particulate materials of differing specific gravities into fractions of differing average specific gravities, respectively higher and lower than a selected specific gravity, which method comprises: introducing a fluid of apparent density approximating but less than said selected gravity near the lower end of a vertically elongated confined space; causing said fluid to flow spirally around and thru said space; discharging a portion of said flow near the upper end of said space and the remainder near the lower end of said space; maintaining the input pressure and flow rate sufficiently high to cause and maintain an open free vortex extending from one open end of said space to the other open end; introducing said particulate mixture near the upper end of said space and into the inner face of the vortex; removing said higher gravity fraction, together with the fluid discharge near the upper end of said space and from a point radially removed from the axis of said space; removing said lighter gravity fraction, together with the fluid discharge substantially axially from the lower end of said space and adjusting the relative flow rates of discharge from said space to cause said higher and lighter gravity fractions to be removed therefrom in predetermined proportions.

4. A device for separating mixtures of particulate solid materials into fractions of differing average densities, respectively heavier and lighter than a selected parting density, which device comprises: a first tubular element horizontally defining a confined space and having a bottom enclosing means, means for introducing fluid medium tangentially into a lower level in said confined space, means for introducing a mixture of particular materials into an upper level of said confined space; a second tubular element extending from without up and into said confined space, said second tubular element having one end thereof open to said confined space at the horizontal center and at an intermediate level thereof for discharging fluid medium and solids, and a discharge conduit means communicating with an upper level in said confined space above the open end of said second tubular element for discharging fluid medium and solids.

5. A device for separating mixtures of particulate solid materials into fractions of differing average densities, respectively heavier and lighter than a selected parting density, which device comprises: a first tubular element horizontally defining a confined space and having a bottom-enclosing means; means for introducing fluid medium tangentially into a lower level in said confined space; means for introducing a mixture of particular materials into an upper level of said confined space; a second tubular element extending from without up and into said confined space; said second tubular element having an upper end thereof open to said confined space at the horizontal center and at an intermediate level thereof for discharging fluid medium and solids, means for controlling the rate of discharge of the fluid medium and solids through said second tubular element, and a discharge conduit means communicating tangentially with an upper level in said confined space above the open end of said second tubular element for discharging fluid medium and solids.

6. A device in accordance with claim 5 wherein said means for controlling the rate of discharge of the fluid medium and solids from said second tubular element comprises, means for extending said element to various levels within said first tubular element.

7. A device in accordance with claim 5 wherein said means for controlling the rate of discharge of the fluid medium and solids from said second tubular element comprises, a second discharge conduit extending from the lower end of said second tubular element to an elevation above the upper end of said element and means for controlling the rate of flow through said second discharge conduit.

8. A device for separating mixtures of particulate solid materials into fractions of differing average densities, respectively heavier and lighter than a selected parting density, which device comprises: a first tubular element horizontally defining a confined space and having a bottom enclosing means; means for introducing fluid medium substantially tangentially into a lower level in said confined space; means for introducing a mixture of particular materials into an upper level of said confined space; a second tubular element extending from without up and into said confined space, said second tubular element having one end thereof open to said confined space at the horizontal center and at an intermediate level thereof for discharging fluid medium and solids, a discharge conduit means communicating with an upper level in said confined space above the open end of said tubular element for discharging fluid medium and solids and means for controlling the rate of flow through said discharge conduit means.

9. A device for separating mixtures of particulate solid materials into fractions of differing average densities, respectively heavier and lighter than a selected parting density, which device comprises: a first tubular element horizontally defining a confined space and having a bottom enclosing means; an annular baffle defining a restricted centrally located opening near the top of said confined space; means for introducing fluid medium into a lower level in said confined space; means for introducing a mixture of particular materials into said confined space through the opening defined by said baffle; a second tubular element extending from without up and into said confined space, said second tubular element having one end thereof open to said confined space at the horizontal center and at an intermediate level thereof for discharging fluid medium and solids, and a discharge conduit having a port communicating with an upper level in said confined space above the open end of said second tubular element, said port being radially removed from the axis of said space for discharging fluid medium and solids.

10. A device in accordance with claim 9 wherein said annular baffle extends obliquely downward to a level below said discharge conduit means in said confined space.

11. A device for separating mixtures of particulate solid materials into fractions of differing average densities, respectively heavier and lighter than a selected parting density, which device comprises: a first tubular element horizontally defining a confined space; means for introducing fluid medium into a lower level in said confined space; an annular baffle extending from the lower end of said first tubular member upward to a level above said means for introducing fluid medium into said space; means for introducing a mixture of particular materials into an upper level of said confined space; a second tubular element extending from without up and into said confined space, said second tubular element having one end thereof open to said confined space at the horizontal center and at an intermediate level thereof for discharging fluid medium and solids, and a discharge conduit means communicating with an upper level in said confined space above the open end of said second tubular element for discharging fluid medium and solids.

12. A device in accordance with claim 11, wherein said annular baffle extends obliquely upward and inward toward the axis of said confined space, being formed with a central opening to receive said second tubular element.

13. A device for separating mixtures of particulate solid materials into fractions of differing average densities, respectively heavier and lighter than a selected parting density, which device comprises: a first tubular element of substantially cylindrical form horizontally defining a confined space; a bottom closure member of truncated conical form having a central opening at a level above the lower end of said first tubular element, means for introducing fluid medium into said confined space; at a level below said central opening; means for introducing a mixture of particular materials into an upper level of said confined space; a second tubular element extending from without up and into said confined space through said central opening, said second tubular element having one end thereof open to said confined space at the horizontal center and at an intermediate level thereof for discharging fluid medium and solids; an annular baffle defining a restricted centrally located top opening into said confined space; a discharge conduit means communicating with an upper level in said confined space above the open end of said second tubular element for discharging fluid medium and solids; means for controlling the rate of discharge of the fluid medium and solids through said second tubular element, and means for controlling the rate of discharge of fluid medium and solids through said discharge conduit.

References Cited in the file of this patent

UNITED STATES PATENTS

| 762,866 | Allen | June 21, 1904 |
| 1,825,157 | Pardee | Sept. 29, 1931 |

FOREIGN PATENTS

| 661,050 | Great Britain | Nov. 14, 1951 |
| 671,943 | Great Britain | May 14, 1952 |